United States Patent
Marshall et al.

(10) Patent No.: US 8,946,972 B2
(45) Date of Patent: Feb. 3, 2015

(54) LAYER SWITCHING FOR AN ULTRASOUND TRANSDUCER ARRAY

(75) Inventors: John Douglas Marshall, Los Gatos, CA (US); Jian-Hua Mo, Milpitas, CA (US); Kutay F. Ustuner, Mountain View, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1589 days.

(21) Appl. No.: 11/505,558

(22) Filed: Aug. 16, 2006

(65) Prior Publication Data
US 2008/0042519 A1 Feb. 21, 2008

(51) Int. Cl.
*H01L 41/08* (2006.01)
*G10K 11/34* (2006.01)
*B06B 1/06* (2006.01)
*G01S 15/89* (2006.01)

(52) U.S. Cl.
CPC .............. *G10K 11/346* (2013.01); *B06B 1/064* (2013.01); *G01S 15/8906* (2013.01)
USPC ........................................................ 310/317

(58) Field of Classification Search
CPC .. A61N 1/37217; B06B 1/064; H01L 27/016; H01L 27/0808; H01L 28/60; H01L 41/107; H01L 41/1132; H01L 41/257
USPC .......... 600/437, 447, 459; 310/316, 317, 319, 310/366, 334–337
See application file for complete search history.

(56) References Cited

U.S. PATENT DOCUMENTS

| | | | | |
|---|---|---|---|---|
| 3,697,862 A | * | 10/1972 | Taylor | ........................ 323/268 |
| 5,608,690 A | | 3/1997 | Hossack et al. | |
| 5,675,554 A | | 10/1997 | Cole et al. | |
| 5,685,308 A | | 11/1997 | Wright et al. | |
| 5,825,117 A | * | 10/1998 | Ossmann et al. | ............. 310/317 |
| 5,957,851 A | | 9/1999 | Hossack | |
| 6,005,827 A | | 12/1999 | Hossack et al. | |
| 6,104,670 A | | 8/2000 | Hossack et al. | |
| 6,269,052 B1 | | 7/2001 | Oppelt | |
| 6,409,667 B1 | | 6/2002 | Hossack | |
| 6,673,016 B1 | * | 1/2004 | Bolorforosh et al. | ......... 600/437 |
| 6,761,692 B2 | | 7/2004 | Angelsen et al. | |
| 2005/0148879 A1 | * | 7/2005 | Ramamurthy et al. | ....... 600/459 |

FOREIGN PATENT DOCUMENTS

JP 64-001956 1/1989

OTHER PUBLICATIONS

JP Office Action (English translation) dated Dec. 1, 2011 in counterpart Japanese application No. 2009-524650, filed Feb. 16, 2009; 4 pages.
Third Chinese Office Action and Search Report dated Aug. 15, 2012 from counterpart Chinese application No. 2007800385660.1; 17 pages.

\* cited by examiner

*Primary Examiner* — Elmer Chao

(57) ABSTRACT

A multi-layer transducer operates with only one system channel per element. Passive switching connects the layers differently for transmit than for receive operation, such as connecting two layers in parallel for transmit and in series for receive. Any passive switching may be used, such as current and voltage limiting circuits. Tuning may be passively switched. Different tuning circuits are passively switched as a function of voltage level between transmit and receive operations.

7 Claims, 4 Drawing Sheets

LAYER SWITCHING FOR AN ULTRASOUND TRANSDUCER ARRAY

BACKGROUND

The present embodiments relate to ultrasound transducers. In particular, switching usage of layers in the transducer is provided.

Bi-layer transducers provide a variety of operating modes not available in conventional transducers. By driving the two layers of an element in phase and then summing the received signals of the two layers out of phase, a harmonic mode is provided. The transmitted acoustic field has low second harmonic content, and received energy includes information at the second harmonic with fundamental frequency suppression.

U.S. Pat. No. 5,957,851 discloses a method for transmitting and receiving signals using layered acoustic elements. However, the method does not make use of both layers of the acoustic element for both transmitting and receiving. More optimum harmonic mode performance may be obtained when both layers of the transducer element are used.

The added flexibility of bi-layered elements comes at the expense of doubled channel count. Each element has two layers of transducer material, and each layer connects with different system channels. A transmit/receive channel is dedicated to each layer of each bilayer element. Transmitter waveforms and receiver signal processing can be optimized independently for each layer to realize the full potential of the bilayer transducer. The extra channel connections may be handled by the host system, but this requires a host system with two channels per element. An alternative is to build signal processing electronics into the transducer to direct transmit pulses to one or both layers of an element. The signal processing electronics phase and combine received signals from the layers. Active components in the transducer may require extra signal lines for control, may require extra power, and may generate undesired heat.

In the host ultrasound system, a transmit/receive (T/R) switch separates each channel into receive and transmit channels. The T/R switch is a passive switch, such as disclosed in U.S. Pat. No. 6,269,052. Active switching elements, such as a high-voltage CMOS analog switch, may not settle very rapidly. This makes it difficult to switch them during a scan line, such as between transmit and receive events for scanning a line. Operating active switching elements also requires carefully timed control signals from the ultrasound system.

BRIEF SUMMARY

By way of introduction, the preferred embodiments described below include methods and systems for multi-layer transducer elements. A multi-layer transducer operates with only one system channel per element. Passive switching connects the layers differently for transmit than for receive operation, such as connecting layers in parallel for transmit and connecting layers in series for receive. Any passive switching may be used, such as current and voltage limiting circuits.

As an alternative or addition to passive switching of layers, tuning may be passively switched. Different tuning is passively switched as a function of voltage level between transmit and receive operations.

In a first aspect, an ultrasound transducer element system is provided. At least one ultrasound transducer element has at least first and second layers of transducer material. A transmit beamformer channel connects with the element such that both first and second layers are responsive to a same transmit waveform. A receive beamformer channel connects with the element such that signals generated by both the first and second layers are provided to the receive beamformer channel.

In a second aspect, an ultrasound transducer element system is provided. At least one ultrasound transducer element has at least first and second layers of transducer material. A passive current limiting circuit connects between at least one of the first and second layers and a system channel.

In a third aspect, a method is provided for transducing between ultrasound and electrical energy. A relatively high voltage transmit waveform is applied to an element. A relatively low voltage receive waveform is generated with the element. Parallel and serial connections of first and second layers of transducer material in the element are passively switched as a function of voltage level.

In a fourth aspect, a method is provided for tuning an ultrasound element. A transmit waveform is applied to an element. A receive waveform is generated with the element in response to the applying. Tuning is passively switched as a function of the applying and generating.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Only one system channel per bi- or multi-layer element is needed, but more than one system channel may be used. Passive switching controls the use of the layers in an element without an external power source or external control signals. Passive current and voltage limiting circuits direct transmitter and receiver currents for tuning and/or multi-layer operation. Passive switching allows for harmonic imaging (e.g., transmit at a fundamental frequency and receive at a harmonic frequency of the fundamental frequency). Active switches may enable an alternate fundamental imaging mode (e.g., transmit and receive at the fundamental frequency).

Figure 1:
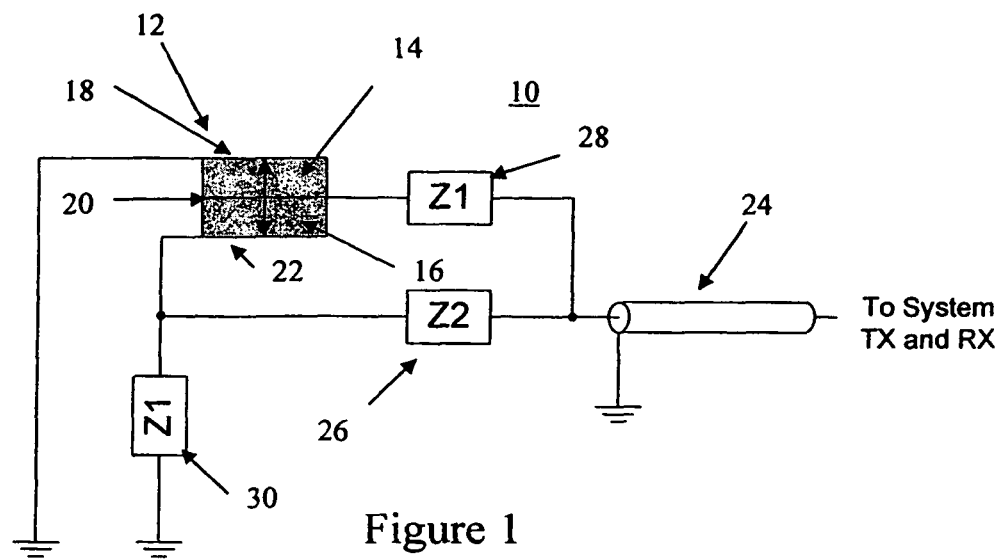
FIG. 1 is a circuit diagram of a first embodiment of a multi-layer element transducer system.

FIG. 1 shows an ultrasound transducer element system 10. The system 10 includes a transducer element 12, a system channel 24 and one or more passive switching circuits 26, 28, and 30. Additional, different or fewer components may be provided. One possible arrangement of passive switching circuits 26, 28, 30 is shown. Other arrangements may use additional, fewer or different passive switching circuits 26, 28, 30 connected in any manner.

The transducer element 12 has a top layer 14 and a bottom layer 16 of piezoelectric material. The layers 14, 16 may both be between a backing layer and a matching layer. Additional layers 14, 16 may be provided, such as three or more layers. The layers 14, 16 are stacked along a range dimension or direction of propagation. Each layer 14, 16 has the same or different elevation and azimuth extent and shape.

The layers 14 and 16 are a same or different piezoelectric material, such as a piezoelectric single crystal, piezoelectric ceramic or piezoelectric polymer material, or their composites with epoxy or other filler materials. In alternative embodiments, the one or more of the layers 14, 16 are electrostatic micromachined devices, such as electrostatic moving membrane devices. In yet other embodiments, the one or more of the layers 14, 16 are electrostrictive material, such as PMN-PT. Each of the layers 14, 16 has a same or different geometry and/or material. For example, the same thickness is used for each layer, such as a ½ mm thickness. Other thicknesses may be used, including thicknesses that vary in one or more dimensions.

In one embodiment, the top and bottom layers 14, 16 have different transducer materials. For example, the bottom layer 16 is a solid piezoelectric material, such as a solid ceramic or electrostatic substrate. The solid piezoelectric material is free of epoxy or free from kerfs for each transducer element. The top layer 14 is piezo-composite material, such as a combination of piezoelectric ceramic and epoxy or polymer. Piezo-composite materials include piezoelectric material beams separated by epoxy-filled kerfs in one dimension or piezoelectric material posts separated by epoxy-filled kerfs in two dimensions, but other piezo-composites may be used. In one example embodiment, the top layer 14 is a piezo-composite having 14-19 Mrayl acoustic impedance, and the bottom layer 16 is a solid piezoelectric material having about 30 Mrayl acoustic impedance.

The transducer material of the layers 14, 16 is poled. In one embodiment, the different layers have substantially opposite poling directions. The poling is along or substantially parallel to the propagation direction. In other embodiments, two or more layers 14, 16 are poled in a same direction.

The electrodes 18, 20, 22 are metal, but other conductors may be used. Sheets with or without flexible circuit material (e.g., polyester film) form the electrodes 18, 20, 22. Alternatively, the electrodes 18, 20, 22 are deposited material. The electrodes 18, 20, 22 are formed as part of the stack, such as with sintering, or are separate layers, such as with asperity contact. In one embodiment, the center electrode 20 is formed in the stack by sintering or asperity contact, but the outer electrodes 18, 22 are formed in the stack with asperity contact and bonding.

Each layer 14, 16, is associated with two electrodes 18, 20, 22. The top layer 14 has electrodes 18, 20 on opposite sides. The bottom layer 16 has electrodes 20, 22 on opposite sides. The center electrode 20 is a single electrode shared by both layers 14, 16. Alternatively, the center electrode 20 is formed from two electrodes in contact with each other.

The electrodes 18, 20, 22 connect with wires, traces, or other conductors for routing signals to or from the electrodes 18, 20, 22. In one embodiment, one or more of the electrodes 18, 20, 22 have a fixed or non-switched connection. For example, the top or outside electrode 18 of the top layer 14 has a fixed connection to a local ground. The top electrode 18 is positioned closest to a patient during use. Alternatively, one, more, or all of the connections of the electrodes 18, 20, 22 are switched, such as with passive and/or active switching. Switched connections to ground may be used.

The system channel 24 is a conductor, coaxial cable, trace, beamformer channel, transmit channel, receive channel, signal path or combinations thereof. In one embodiment, the system channel 24 is a single coaxial cable. Separate or multiplexed system channels 24 are provided for each element 12.

The system end of the system channel 24 connects with a transmit/receive (T/R) switch and/or transmit and receive beamformer channels. The T/R switch is a passive, active or both passive and active switching circuit. Any now known or later developed T/R switch circuit may be used, such as disclosed in U.S. Pat. No. 6,269,052, the disclosure of which is incorporated herein by reference. The T/R switch circuit connects the system channel 24 with the transmit beamformer and the receive beamformer. The T/R switch routes low voltage signals to the receive beamformer channel and routes higher voltage signals from a transmit beamformer channel to the system channel 24 while protecting or open circuiting the receive beamformer channel.

The system channel 24 connects the transmit beamformer channel with the element 12. The transmit beamformer channel is an analog or digital transmit beamformer channel. For example, a transmit beamformer disclosed in U.S. Pat. No. 5,675,554, 5,608,690, 6,005,827, or 6,104,670, the disclosures of which are herein incorporated by reference, is used. Other sources of waveforms may be used, such as waveform generators, pulsers, switches, a waveform memory, mixer, or digital-to-analog converter. The waveform for a given transmit beamformer channel is delayed and amplified relative to other transmit beamformer channels.

The system channel 24 connects the receive beamformer channel with the element 12. The receive beamformer channel is an analog or digital receive beamformer channel. For example, a receive beamformer disclosed in U.S. Pat. No. 5,685,308, the disclosure of which is incorporated herein by reference, is used. The receive beamformer channel includes a delay, phase rotator, summer, and/or filter for relatively delaying and apodizing signals from different channels and then summing the signals.

An optional filter may be included in the receive beamformer or separate from the receive beamformer. The filter provides highpass, bandpass, lowpass or spectral whitening response. The filter passes information associated with the desired frequency band, such as the fundamental transmit frequency band, a harmonic of the fundamental frequency band or any other desired frequency band. As used herein, harmonic comprises higher harmonics (e.g., second, third, . . . ), fractional harmonics (3/2, 5/3, . . . ), or subharmonics (½, ⅓, . . . ). The filter may comprise different filters for different desired frequency bands or a programmable filter. For example, the filter demodulates the signals to base band. The demodulation frequency is programmably selected in response to the fundamental center frequency or another frequency, such as a second harmonic center frequency. Signals associated with frequencies other than near the base band are removed by low pass filtering. As another example, the filter provides band pass filtering.

As an additional or alternative option, a memory, phase rotator, amplifier (e.g., multiplier) and/or summer are provided. By combining received signals responsive to different transmit events with relative phasing and/or weighting, information as desired frequencies may be isolated or enhanced relative to other frequencies.

The system channel 24 connects both the top and bottom layers 14, 16 of the element 12 with the transmit and receive beamformer channels. On the element 12 end of the system channel 24, passive nonlinear switching enables the multiple layer element 12 to be operated using only one system channel per element 12 while offering harmonic imaging performance. The passive switching directs electrical energy through one path or another path based on the amplitude of the signal. Nonlinear circuit elements direct transmit and receive signals to alternate paths. Current and voltage limiting nonlinear passive switching circuits 26, 28 and 30 switch the system channel 24 and/or ground to different electrodes 18, 20, 22.

Figure 2:
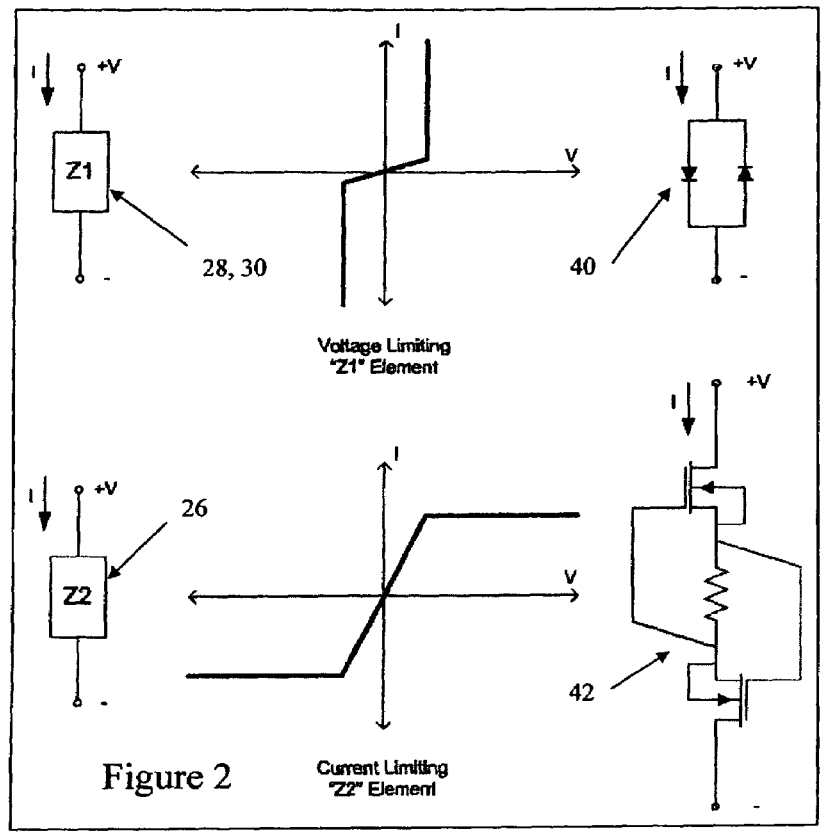
FIG. 2 is a graphical and circuit diagram of passive switching elements according to two embodiments.

The passive switching circuit 26 as a current limiting circuit includes two transistors 42 shown in FIG. 2. The transistors 42 each have gate terminals fed back via a current sensing impedance (e.g., a resistor) to source terminals. The transistors 42 are n-channel depletion mode MOSFETs, but other transistors may be used. Other passive current limiting circuits may be used, such as disclosed in U.S. Pat. No. 6,269,052. Other passive current limiting circuits may have fewer or more transistors connected with different, the same or no feedback.

FIG. 2 also shows the relationship of voltage to current of the current limiting circuit. The current amplitude is limited symmetrically or asymmetrically about a zero value for sufficient voltage amplitude. This current-voltage characteristic shows a low incremental resistance for small voltages. As a threshold current is approached, the incremental resistance rises rapidly and the current is limited. Using the MOSFETs described above, the passive current limiting circuit 26 has a small signal incremental resistance around 10 to 20Ω and limits the current to about ±10 mA to ±50 mA. Other resistance and/or current limits may be used.

Referring again to FIG. 1, the passive switch circuit 26 is a passive current limiting circuit connected between one or more of the layers 14, 16 and the system channel 26. For example, the passive current limiting circuit connects between the system channel 24 and the outside electrode 22 or outer terminal of the bottom layer 16. The passive current limiting circuit is a passive switch 26, operable to disconnect the system channel 24 from the electrode 22 during transmit operation and connect the system channel 24 to the electrode 22 for receive operation. The high voltages associated with transmit operation are limited to low current, substantially creating an open circuit between the system channel 24 and the electrode 22. The low voltages associated with receive operation are within the current limits, so a pass through or a short circuit is effectively created.

Referring to FIG. 2, the passive switch circuits 28, 30 are passive voltage limiting circuits, such as antiparallel diodes 40. For example, a double pn junction diode pair is used. Other diodes 40 may be used, such as Schottky diodes. Passive voltage limiting circuits with fewer, additional or no diodes 40 may be used. The passive voltage limiting circuits 28, 30 may have the same or different configuration, circuit arrangement, types of components or other characteristics.

FIG. 2 shows the relationship of voltage to current for the passive voltage limiting circuits. The current voltage characteristic shows a high incremental resistance for small voltages. As a threshold voltage is approached, the incremental resistance falls rapidly and the voltage is limited. With silicon diodes 40, the passive voltage limiting circuit 28, 30 clamps the voltage swing to about ±0.6V.

Referring again to FIG. 1, one passive voltage limiting circuit (passive switch circuit 28) connects between the element 12 and the system channel 24. For example, the passive voltage limiting circuit connects between the system channel 24 and the shared electrode 20 or the center terminal. The other passive voltage limiting circuit (passive switch circuit 30) connects between ground and the outside electrode 22 of the bottom layer 16. The passive voltage limiting circuits are passive switching circuits 28, 30. High voltages, such as associated with transmit operation, allow currents to pass through or to be effectively short-circuited by the passive voltage limiting circuits. Lower voltages, such as associated with receive operation, are effectively prevented from passing, such as a substantially open circuit.

The passive switches 26, 28, 30 are within the transducer probe. For example, the passive switches 26, 28 30 are integrated on a same or different semiconductor substrate positioned adjacent to the elements 12. One or more of the passive switches 26, 28, 30 may be positioned in the transducer connecter or the ultrasound imaging system. Extra conductors or coaxial cables are provided for remote passive switching. Power dissipation in the transducer probe may be limited or reduced by positioning the passive switches 26, 28, 30 away from the probe.

Figure 3:
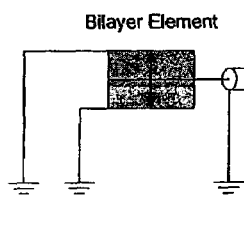
FIG. 3 is a circuit diagram of FIG. 1 passively switched for one mode of operation.

In the embodiment shown in FIG. 1, the passive switching circuits 26, 28, 30 connect the system channel 24 to the element 12 such that both top and bottom layers 14, 16 are responsive to a same transmit waveform. The center terminal or electrode 20 is connected with the system channel 24 and associated transmit beamformer channel. FIG. 3 shows the passive current limiting circuit (passive switch 26) acting as an open circuit and the passive voltage limiting circuits (passive switches 28, 30) acting as closed circuits. The high voltage signal from the transmit beamformer causes the configuration of FIG. 3. When the center terminal (electrode 20) is driven or sensed relative to a common return path contacting both the top and bottom terminals (electrodes 18, 22), the two layers 14, 16 of the element act in phase due to the opposite poling. The element 12 responds at a fundamental transmit frequency fo or associated band with a suppressed response at the second harmonic frequency 2fo or associated band.

Figure 4:
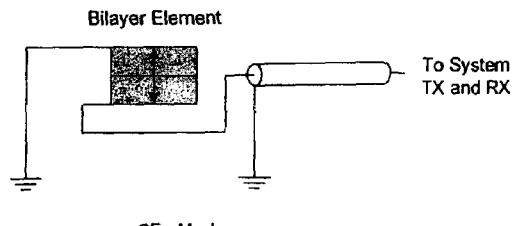
FIG. 4 is a circuit diagram of FIG. 1 passively switched for another mode of operation.

The passive switching circuits 26, 28, 30 connect the system channel 24 to the element 12 such that signals generated by both the layers 14, 16 are provided to the receive beamformer channel. The receive beamformer channel connects across both the layers 14, 16. The outside electrode 22 of the bottom layer 16 connects with the system channel 24 and associated receive beamformer channel. FIG. 4 shows the passive current limiting circuit (passive switch 26) acting as a closed circuit and the passive voltage limiting circuits (passive switches 28, 30) acting as open circuits. The low voltage receive signal generated by the layers 14, 16 in response to the transmitted acoustic energy causes the configuration of FIG. 4. When the element 12 is driven or sensed directly across the entire thickness (i.e., both layers), the opposing poling of the two stacked layers 14, 16 causes a summation of signals out of phase. The element 12 responds strongly at a second harmonic frequency 2fo or band of the fundamental frequency or band with a suppressed response at the fundamental frequency fo or band.

The passive switching provides automatic switching during transmit and receive operation. For harmonic operation, the system 10 automatically drives the element 12 in a fundamental fo mode and senses the element 12 in response in a harmonic 2fo mode. Other arrangements are possible, such as with more layers and/or different poling. The transmit operation may be at the fundamental frequency with the receive operation being at a fractional harmonic, such as ½ harmonic.

Other arrangements of passive switching circuits 26, 28, 30 may be used, such as connecting to different electrodes 18, 20, 22, connecting to more than one electrode 18, 20, 22, connecting in parallel and/or series, or connecting to ground. One passive current limiting circuit is used, but none or more may be used. Two passive voltage limiting circuits are used, but none, fewer or more may be used.

Figure 5:
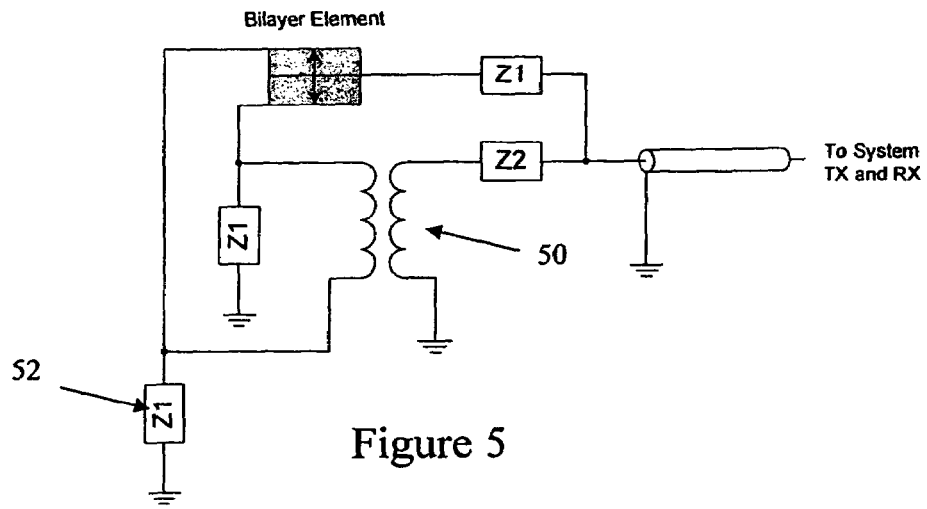
FIG. 5 is a circuit diagram of a second embodiment of a multi-layer element transducer system.

FIG. 5 shows another embodiment with three passive voltage limiting circuits (passive switches 28, 30 and 52). A transformer 50 connects between the passive switch 26 and the electrode 22. The transformer 50 has a 1:1 winding ratio. The effective impedance of the receive path may be varied by varying the winding ratio away from 1:1 in either direction. One end of the secondary winding of the transformer 50 connects with the electrode 22 and another end connects with the electrode 18. The additional passive voltage limiting circuit (passive switch 52) connects the electrode 18 and the transformer 50 with local ground.

The system 10 of FIG. 1 provides a partially asymmetrical ground for the layers 14, 16 of the element 12 during harmonic operation shown in FIG. 4. The passive voltage limiting circuit (passive switch 30) causes the lower layer 16 to be driven with approximately 0.6V less voltage than the upper layer 14. FIG. 5 provides a more balanced arrangement. Both layers 14, 16 are subjected to the same voltage offset from ground caused by the passive voltage limiting circuits (passive switches 30, 52). Improved second harmonic rejection in the transmitted signal may be provided.

The embodiments of FIGS. 1 and 5 are free of active switching. In alternative embodiments, one or more of the passive switches are replaced with active switches. In other embodiments, active switches are provided.

Figure 6:
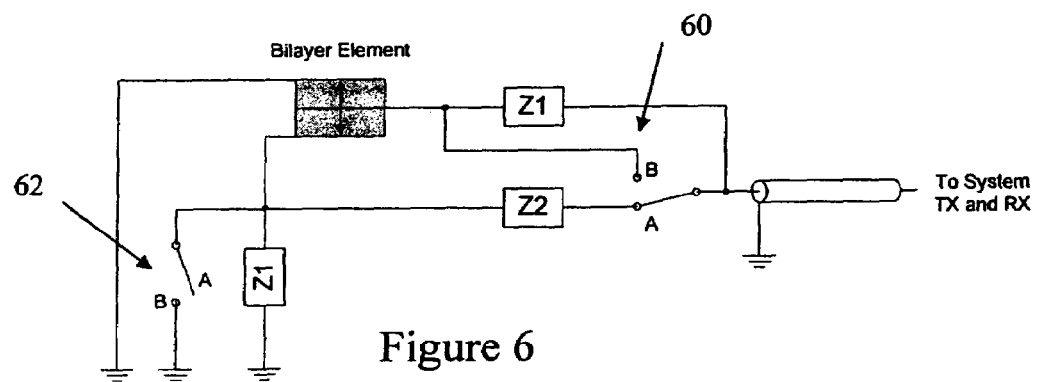
FIG. 6 is a circuit diagram of a third embodiment of a multi-layer element transducer system.

FIG. 6 shows an embodiment with active and passive switching. Active switches 60, 62 are FET switches, but other transistors may be used. The switch 60 is a single pole single throw switch. The switch 62 is a double pole switch, such as an arrangement of two single pole single throw switches.

The active switches 60, 62 reassign the signal paths and provide both harmonic and fundamental imaging modes. With the switches 60, 62 in position A, the element 12 operates in harmonic mode (e.g., transmitting at fo and receiving at 2fo). With the switches 60, 62 in position B, the element 12 operates in fundamental mode for both transmitting and receiving. The switches 60, 62 may settle slowly. Since the switches 60, 62 are static after the imaging mode is set, switch settling may not alter performance of the element 12. For multiple-mode situations, such as Doppler imaging in fundamental mode interleaved with harmonic mode imaging, rapid mode changes may be used. Settling time and power dissipation may alter performance or sufficient active switches may be identified.

In other embodiments, two layers are poled in substantially a same direction. Passive switching makes serial electrical connection to the two layers for transmit and makes parallel electrical connection to the two layers for receiving. There is duality of poling direction versus electrical connections in realizing fundamental and harmonic mode operations.

Figure 9:
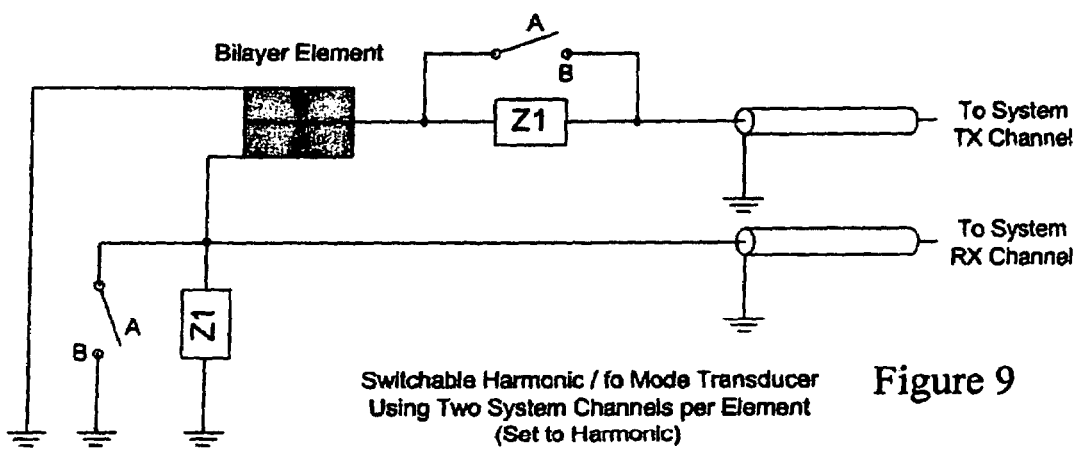
FIG. 9 is a circuit diagram of a fourth embodiment of a multi-layer element transducer system.

FIG. 9 shows an embodiment using separate transmit and receive channels for operation with the multi-layer element. The ultrasound system has: a) MN independent channels (where M is the number of layers and N is the number of elements), b) MN/2 channels for transmit and MN/2 channels for receive that are independent from each other (M is even), or c) a multiplexer that can switch fast from one half of the MN inputs to the other half between the receive and transmit events. Transducers with greater than two layers per element may use this configuration with only 2N system channels.

Fewer passive switching devices may be provided by having a greater number of channels. The optional active switches are in position A for harmonic mode operation or position B for fundamental mode operation. The phases of the transmit and receive signals to the two layers of the bilayer element are automatically set based on the passive switches Z1. In fundamental mode, the upper system channel is used both for transmitting and receiving. In another embodiment, the layers 14, 16 are poled in a same direction, and the transmit (TX) channel connects with the top layer 14 top electrode 18 or the bottom layer 16 bottom electrode 22.

Figure 7:
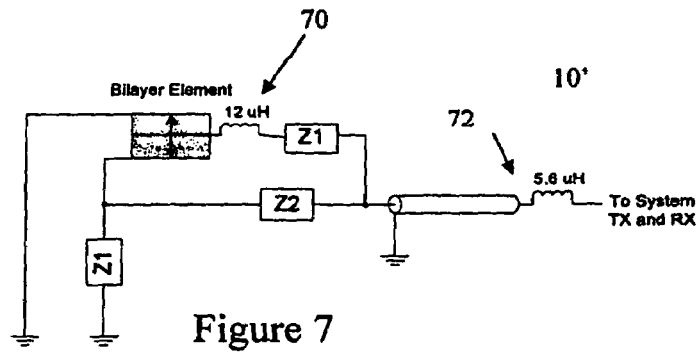
FIG. 7 is a circuit diagram of one embodiment of passively switched tuning circuits.

FIG. 7 shows another embodiment of a system 10' using passive switching. The passive switches 26, 28, 30 operate to control the fundamental and harmonic response as discussed above for FIG. 1, but also tune the element 12 as a function of transmit and receive operation. In other embodiments, passive switching provides tuning without fundamental and harmonic response changes.

The system 10' has tuning circuits 70, 72. The tuning circuits 70, 72 are a resistor, a capacitor, an inductor, or combinations thereof. As shown, the tuning circuits 70, 72 each have a different impedance provided by a single inductor. More than one type of tuning component may be provided, such as a parallel or series connection of multiple inductors, capacitors and/or resistors. Any now known or later developed tuning circuit 70, 72 may be used. The tuning provides impedance matching.

One or more of the passive switches 26, 28, 30 connect with one or more of the tuning circuits 70, 72. As shown in FIG. 7, one tuning circuit 70 connects between the element 12 and one passive switch 28. The passive switch 28 adds or removes the tuning circuit 70 during operation based on the transmit or receive mode of operation. The voltage limiting circuit of passive switch 26 switches the tuning circuit 70 in or out of the path being used. Other voltage limiting circuits and associated positions of the tuning circuit 70 may be used. Alternatively, the tuning circuit 70 is switched with a current limiting circuit of passive switch 28 or combinations of different types of passive switching.

Another tuning circuit 72 connects with the system channel 24, so tunes during both transmit and receive operation. The other tuning circuit 72 is in the transducer connector or the imaging system. Alternatively, the tuning circuit 72 is in the transducer probe.

The transmit and receive responses of the element 12 are optimized separately using passive switching. Different tuning for transmit and receive operation matches the beamformer channels with the different element 12 impedance responses. Optimization of transmit and receive responses uses different tuning inductor values. Using the passive switching shown in FIG. 7, the element 12 sees 12 µH head or transducer tuning for transmit operation and sees 0 µH head or transducer tuning for receive operation.

Figure 8:
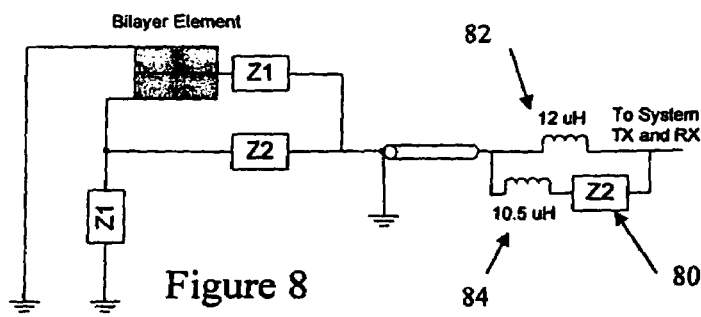
FIG. 8 is a circuit diagram of another embodiment of passively switched tuning circuits.

FIG. 8 shows another embodiment of passive switching for different tuning for transmit operation than for receive operation. While shown with the passive switching for harmonic mode imaging, the element without passive switching and/or with a single layer of transducer material may be used. A passive switch 80, such as a passive current limiting circuit, connects in series with a tuning circuit 84 (e.g., inductor). Another tuning circuit 82 (e.g., another inductor) connects in parallel with the series tuning circuit 84 and passive switch 80.

The tuning circuits 82, 84 are positioned in the transducer connector and/or the imaging system. Alternatively, one or both of the tuning circuits 82, 84 are in the transducer probe.

The passive switch 80 is off or effectively an open circuit during transmit operation. The transmit path only has the tuning circuit 82 (e.g., a 12 µH inductor). With the small current during receive operation, the passive switch 80 is effectively closed or on, so the receive path sees tuning based on the parallel tuning circuits 82, 84 (e.g., 12 µH and 10.5 µH in parallel resulting in 5.6 µH relative to the element 12). Other inductor values, passive switches, networks of passive switches, tuning circuits, combinations of tuning circuits, series connections, and/or parallel connections may be provided. This tuning embodiment and method may be used with any transducer—not just a bilayer device.

A method for transducing between ultrasound and electrical energy uses passive switching. One of the embodiments of FIG. 1 or 4-8, or a different system of passive switches implements the method. Passive switches, such as passive current and/or voltage limiter circuits, provide different transmit and receive configurations as a function of voltage of the signals. Electrical access to the transducer layers of a multi-layer element passively switches between parallel and serial connections. The transducer may transmit in a fundamental (f0) mode and receive in a harmonic (e.g., 2f0) mode without active switch control between transmit and receive.

In one particular example, a transmit waveform is applied to an element. The transmit waveform is a unipolar, bipolar, sinusoidal, square wave or other waveform with any number of cycles. The waveform is applied by the transmit beamformer outputting the waveform on the system channel or through a transmit/receive switch. The system channel conducts the electrical waveform to one or more electrodes of the element, such as conducting the waveform to a center element between two layers of transducer material. The transmit waveform may be applied across fewer than all of the layers, applied to the layers in parallel, or applied to the layers in series.

The transmit waveform has a relatively high voltage amplitude, such as positive and/or negative 10 or more volts (e.g., 100-200 volts). Lesser or greater voltages may be used.

The transmit waveform is of a desired frequency or frequency band. For example, a center frequency of 2 MHz is provided with any size of frequency band, such as 1 or 2 MHz band. The center frequency and corresponding bandwidth are a fundamental transmit frequency and band.

In response to the transmit waveform, the transducer material generates acoustic energy. The different layers of transducer material contribute to the generation of acoustic energy. One or more elements generate acoustic energy during a given transmit event. Using relative phasing and/or apodization between elements, a beam or beams of acoustic energy are formed.

Structure, such as tissue or fluids, reflects some of the acoustic energy back to the transducer elements. For harmonic imaging, nonlinear propagation and/or reflection generates harmonic information. Harmonic information is used for one of tissue imaging or contrast agent imaging. In tissue imaging, no additional contrast agent is added to the target during an imaging session. Only the characteristics of a tissue, including blood or other fluids, are relied on to create the ultrasonic image. Medical ultrasound imaging is typically conducted in a discrete imaging session for a given subject at a given time. For example, an imaging session can be limited to an ultrasound patient examination of a specific tissue of interest over a period of ¼ to 1 hour, though other durations are possible. In this case, no contrast agent is introduced into the tissue at any time during the imaging session. Tissue harmonic images may provide a particularly high spatial resolution as a function of the echo generated from the tissue at harmonic frequencies. In particular, there may often be less clutter in the near field. Additionally, because the transmit beam is generated using the fundamental frequencies, the transmit beam profile may be less distorted by a specific level of tissue-related phase aberration than would a transmit beam formed using signals transmitted directly at the second harmonic.

Imaging may be aided by the introduction of contrast agents. In contrast agent harmonic imaging, any one of a number of well known ultrasound contrast agents, such as microspheres, are added to the target or patient in order to enhance the nonlinear response of the tissue or fluid. The contrast agents radiate ultrasonic energy at the harmonic of an insonifying energy at fundamental frequencies. Alternatively, information at the fundamental frequencies is of interest.

The reflected acoustic energy is converted to electrical energy by the transducer elements. In response to applying the transmit waveform and generating the acoustic transmit energy, an electrical receive waveform is generated by the element. The layers of transducer material each contribute to the generation of the receive waveform or separate waveforms are electrically combined. For example, the receive waveform is generated across all or some of the layers in series. An outside electrode of a layer connects with the system channel to conduct the receive waveform. Given opposite poling of the layers, the serial connection generates information at a harmonic band of the fundamental frequency band. Information may also or alternatively be generated at the fundamental band.

The receive waveform has a relatively low voltage as compared to transmit waveforms. For example, the receive waveform has an amplitude of positive and/or negative 10 or less volts. Higher or lower voltages may be used.

The higher voltage transmit waveform and lower voltage receive waveform pass along a same channel. The transmit and receive operations share a conductor, such as sharing a coaxial cable. The layers of the element are used differently for transmit and receive operations.

To provide the different use of the layers while sharing a channel, passive switching is used. Passive switches alter between parallel and serial connections of the layers of transducer material in the element. The switching occurs as a function of voltage level. A voltage limiting circuit passively acts as a closed circuit for high voltages, but acts as an open circuit for lower voltages. A current limiting circuit passively acts as an open circuit for high voltages, but acts as a closed circuit for lower voltages.

For example, higher voltage transmit waveforms pass through closed switches to one or more electrodes, such as a center electrode between layers, and are prevented from passing through one or more open switches to one or more other electrodes. Lower voltage receive waveforms pass through different closed switches from one or more different electrodes, such as an outer electrode of one layer, and are prevented from passing through one or more different switches from other electrodes. Voltage limiting is performed with a diode or other circuit, and current limiting is performed with a passive transistor or other circuit. The arrangement of passive switches, such as current and/or voltage limiting circuits, switches between the parallel connection of layers for the transmit waveforms and the serial connection of layers for the receive waveforms. In the example embodiment of FIG. 1, voltage limiting is provided from the channel to a center electrode between the layers, current limiting is provided from the channel to an electrode opposite the center electrode on one of the layers, and voltage limiting is provided from the other electrode opposite the center electrode on the other layer to ground.

Passive switching may provide asymmetrical or symmetrical (i.e., balanced) grounding of the layers. For balanced grounding, such as with FIG. 5, a transformer isolates the grounding during application of the transmit waveform. A same or similar passive switching of each layer to ground is provided.

Active switching may also be performed. The passive switching as a function of voltage level is performed repetitively during scanning of a region. Each transition between transmit and receive operation results in passive switching. Active switching is performed with the same or different frequency, such as between interleaved scans or for different overall modes of imaging (e.g., B-mode, contrast agent mode, tissue harmonic mode, Doppler mode or other imaging mode).

The active switches rearrange or bypass the configuration of passive switches. By actively switching, the switching of the passive switches may be controlled. In one mode, the passive switching or lack of passive switching provides for transmitting and receiving at fundamental frequencies. In another mode set by active switches, passive switching provides. for transmit and receiving at different frequencies. The active switching may select between different passive switching arrangements, such as to provide different combinations of components or serial verses parallel connections of layers.

The passive switching may alternatively or additionally provide a method for tuning an ultrasound element. By passively switching as a function of applying transmit waveforms and generating receive waveforms, different tuning is provided. Different tuning circuits or combinations of tuning circuits are provided. In one embodiment, passive switching disconnects one or more tuning circuits. In other embodiments, passive switching connects one or more tuning circuits. One or more tuning circuits may be connected for both transmit and receive operations. Different tuning is provided by any different combination of tuning circuits. For example, a tuning circuit is switched in and out of connection with no other or other tuning circuits. As another example, different tuning circuits or combinations of circuits are provided for different modes. The modes correspond to transmit and receive operation where the passive switching is a function of the signal voltage level.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. An ultrasound transducer element system, the system comprising:
at least one ultrasound transducer element comprising at least first and second layers of transducer material having a single center terminal between the first and second layers, each of the first and second layers of transducer material operable to convert between electrical and acoustic energies based on a transduction nature of the transducer material;
a transmit beamformer channel connected with the element such that both first and second layers are responsive to a same transmit waveform, the transmit waveform applied to the single center terminal between the first and second layers;
a receive beamformer channel connected with the element and configured such that signals generated by both the first and second layers, in response to acoustic echoes to acoustic energy transmitted by the transmit beamformer, are provided to the receive beamformer channel;
a passive switching circuit connected between and with the single center terminal and both of the transmit beamformer channel and the receive beamformer channel.

2. The system of claim 1 further comprising:
a single coaxial cable connecting both the first and second layers with the transmit and receive beamformer channels.

3. The system of claim 1 wherein the passive switching circuit is operable to switch between connecting the center terminal between the first and second layers with the transmit beamformer channel and connecting the receive beamformer channel across both the first and second layers.

4. The system of claim 3 wherein the first layer is poled in a substantially opposite direction as the second layer.

5. The system of claim 3 wherein the passive switching circuit comprises a current limiting passive switch and a first voltage limiting passive switch connected with an outer terminal of the first layer, the outer terminal on an opposite side of the first layer as the center terminal, and a second voltage limiting passive switch connected with the center terminal.

6. The system of claim 1 wherein the first layer is poled in a substantially same direction as the second layer.

7. The system of claim 1 further comprising:
a tuning circuit; and
wherein the passive switching circuit is connected with the tuning circuit, the passive switching circuit operable to connect the tuning circuit with the element for a first mode and disconnect the tuning circuit from the element for a second mode.

* * * * *